No. 886,004. PATENTED APR. 28, 1908.
F. K. LATHROP.
CLUTCH MECHANISM.
APPLICATION FILED DEC. 18, 1905.

Witnesses
Inventor
Frank K. Lathrop
by Alfred M. Allen
Attorney

UNITED STATES PATENT OFFICE.

FRANK K. LATHROP, OF DAYTON, OHIO, ASSIGNOR TO THE OHIO RAKE COMPANY, OF DAYTON, OHIO, A CORPORATION OF OHIO.

CLUTCH MECHANISM.

No. 886,004.　　　　Specification of Letters Patent.　　　　Patented April 28, 1908.

Application filed December 18, 1905. Serial No. 292,265.

*To all whom it may concern:*

Be it known that I, FRANK K. LATHROP, a citizen of the United States, residing in Dayton, county of Montgomery, and State of Ohio, have invented certain new and useful Improvements in Clutch Mechanisms for Check-Row Corn-Planters, of which the following is a full, clear, and exact description, reference being had to the accompanying drawings, forming part of this specification.

My invention relates to devices for actuating the clutch mechanism on the operating shaft in corn planters, whereby the oscillation of the check row shaft by the tappet levers as they contact with the tappets of the check row line shall couple and disconnect alternately the operating shaft from the driving mechanism to actuate the seeding devices at fixed intervals, and the invention consists of that certain novel construction and operation of parts to be hereinafter particularly pointed out and claimed.

Figure 2:
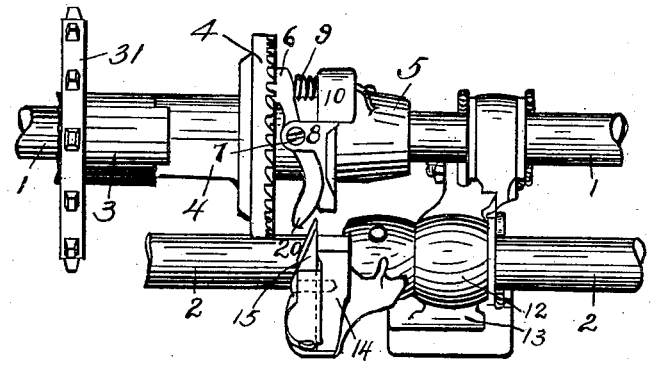
Figure 1:
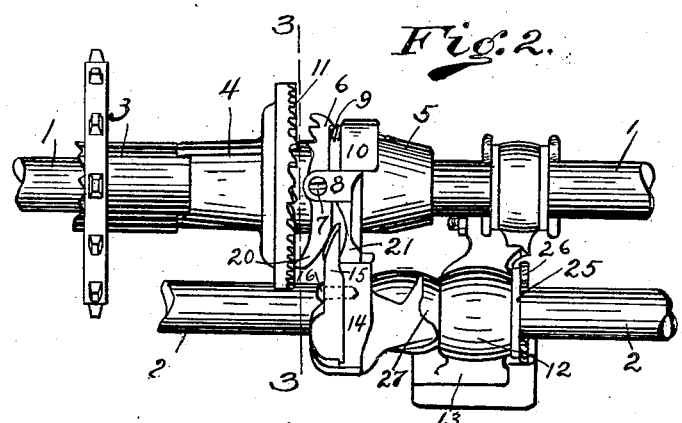
Figure 3:
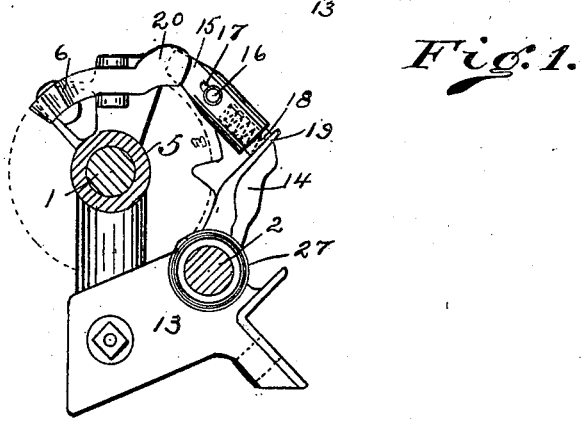

In the drawings Figure 1 is a front elevation of my improved construction with the clutch disconnected. Fig. 2 is a similar view with the operating shaft coupled to the driving mechanism. Fig. 3 is a cross section taken on the line 3—3 of Fig. 1.

As my invention relates only to the operating shaft clutch mechanism, I have not illustrated any of the parts of the corn planter except portions of the operating shaft and check row shaft and it will be readily understood that my improvements can be applied to any of the usual constructions of check row corn planters without any detailed description thereof.

1 is the operating shaft journaled across the machine for operating the seeding devices in the seed hoppers and 2 is the check row shaft also journaled across the frame and provided at its ends with the usual forked levers which engage the tappets on the check row line to oscillate the rock shaft at the desired intervals.

3 is a sleeve loosely mounted on the seed shaft 1, so as to rotate thereon, and driven by sprocket wheel 31 or gearing fixed thereon, connected with the carrying wheels or other driving mechanism of the planter. The sleeve 3 carries a ratchet disk 4 locked thereto, or integral therewith, and also loosely mounted on the operating shaft 1. Keyed on the operating shaft adjoining the ratchet disk is a collar 5 which collar carries a pawl 6 pivoted at 7 to the lug 8 on the collar, while the spring 9 bearing between the upper end of the pawl 6 and a projection 10 in the collar tends to throw the pawl into engagement with the teeth 11 of the ratchet disk and to lock the disk to the collar and thus to couple the driving mechanism of the planter with the operating shaft for the rotation of same to actuate the seeding devices.

The check row rock shaft is journaled and supported in a sleeve 12 on the bracket 13 bolted to the frame work, the shaft being held from side shifting by the washers and cotter pin 26. Keyed on the rock shaft 2 is a collar 27, which carries a tripping arm 14 upon which is mounted a wedge 15. This wedge is mounted on the arm 14 by the pin 16, which passes through a slot 17 in the wedge, so that the wedge has a limited vertical play, and is normally held extended by the spring 18 bearing between the base of the wedge and a supporting flange 19 on the tripping arm. The tripping arm and the wedge are located in such position that the wedge, when the rock shaft is in its normal position, shall enter between the depending arm 20 of the pawl 6 and a depending portion or stop 21 of the collar 5, and thus the pawl 6 will be held out of engagement with the ratchet disk 4 and the operating shaft disconnected from the driving mechanism. When the rock shaft 2 is rocked by the engagement of one of its forked levers with a tappet on the check row line, the tripping arm 14 and the wedge will be rocked away from engagement of the pawl 6 permitting the coupling of the operating shaft with the driving mechanism to actuate the seeding devices. As soon as the forked lever of the rock shaft is tripped to permit the engaging tappet to pass, the rock shaft is returned to its normal position by a spring or otherwise, and the tripping arm and wedge rise into the pathway of the rotating pawl and collar so that upon a completion of the revolution of the operating shaft the wedge will engage the pawl to disconnect the clutch. The initial contact of the pawl and collar depresses the wedge against the pressure of the spring 18 and then the wedge is pressed out by the spring throwing the pawl teeth entirely away from the ratchet disk. This action of the disengaging wedge is important as otherwise if a relatively fixed wedge or tripping arm were projected by the rock shaft into the pathway of the pawl the moment the teeth of the pawl were disengaged from the ratchet the seed shaft would be disconnected, allowing the teeth of the ratchet plate to scrape on the teeth of the pawl, causing wear and rattling of the parts, and a possible engagement of the pawl with the ratchet at an improper time. For drill planting, the tripping arm is permanently turned back out of the way, and locked in inoperative position by a suitable hook.

Having thus described my invention, what I claim as new and desire to secure by Letters Patent, is:

1. In a clutch mechanism for corn planters and the like, the combination with the shaft for operating the seeding device and the check row shaft, of a pawl and ratchet clutch mounted on the seeding device shaft, and a yielding wedge piece on the check row shaft arranged to engage the pawl only of the clutch to release the same.

2. In a clutch mechanism for corn planters and the like, the combination with the shaft for operating the seeding device and the check row shaft, of a pawl and ratchet clutch mounted on the seeding device shaft, a stop fixed on the seeding device shaft, and a yielding wedge piece on the check row shaft arranged to engage said pawl and stop whereby the pawl is operated to release the clutch.

3. In a clutch mechanism for corn planters and the like, the combination with the shaft for operating the seeding device and the check row shaft, of a pawl and ratchet clutch mounted on the seeding device shaft, and a wedge piece on the check row shaft arranged to engage the pawl only of the clutch, said pawl being arranged to operate between the wedge and ratchet.

FRANK K. LATHROP.

Witnesses:
   MAY B. MATHER,
   E. J. FINKE.